United States Patent
Goutal et al.

(10) Patent No.: US 12,493,689 B2
(45) Date of Patent: Dec. 9, 2025

(54) DETECTION OF SYNTHETIC TEXT IN EMAILS IN AN ORGANIZATION INBOUND EMAIL TRAFFIC

(71) Applicant: VADE USA, INCORPORATED, San Francisco, CA (US)

(72) Inventors: Sebastien Goutal, San Francisco, CA (US); Jean-Marc Taing, Nogent-sur-Marne (FR); Maxime Marc Meyer, Lubersac (FR)

(73) Assignee: VADE USA INCORPORATED, San Francisco, CA (US)

( * ) Notice: Subject to any disclaimer, the term of this patent is extended or adjusted under 35 U.S.C. 154(b) by 243 days.

(21) Appl. No.: 18/138,251

(22) Filed: Apr. 24, 2023

(65) Prior Publication Data
US 2024/0354403 A1    Oct. 24, 2024

(51) Int. Cl.
*G06F 21/55* (2013.01)
*G06V 30/18* (2022.01)
*G06V 30/19* (2022.01)

(52) U.S. Cl.
CPC .......... *G06F 21/554* (2013.01); *G06V 30/18* (2022.01); *G06V 30/19* (2022.01); *G06F 2221/034* (2013.01)

(58) Field of Classification Search
CPC ...... G06V 30/18; G06V 30/19; G06F 21/554; G06F 2221/034
See application file for complete search history.

(56) References Cited

U.S. PATENT DOCUMENTS

| | | | | |
|---|---|---|---|---|
| 9,053,320 B2* | 6/2015 | Thomas | .............. | H04L 63/1425 |
| 9,058,381 B2* | 6/2015 | Thomas | .............. | H04L 63/1425 |
| 10,404,745 B2* | 9/2019 | Verma | .................... | G06N 20/20 |
| 10,795,987 B2* | 10/2020 | Chopra | .................. | G06Q 30/01 |
| 11,368,422 B1* | 6/2022 | Sohn | ...................... | H04L 51/212 |
| 11,765,116 B2* | 9/2023 | Sampath | ................. | G06F 40/30 |
| | | | | 709/206 |
| 12,355,715 B2* | 7/2025 | Sampath | ............... | G06F 40/284 |

(Continued)

OTHER PUBLICATIONS

Souradip Chakraborty et al., On the Possibilities of AI-Generated Text Detection (Apr. 10, 2023) (Year: 2023).*

(Continued)

*Primary Examiner* — Sharon S Lynch
(74) *Attorney, Agent, or Firm* — YOUNG LAW FIRM, P.C.

(57) ABSTRACT

A computer-implemented method of detecting synthetic text in an email may determine whether the sender of a received email is a named individual and if so, may extract textual content from the email. When the size of the extracted textual content is at least equal to a configurable size threshold, the extracted textual content may be analyzed using a plurality of synthetic text detection engines, each being configured to generate a synthetic text detection score. The synthetic text detection scores may then be compared to a respective score threshold associated with each of the synthetic text detection engines. An action to warn and/or protect the recipient of the email may be carried out when one or more synthetic text detection scores is at least equal to a respective associated score threshold, which is indicative of a detection of synthetic textual content in the received email.

23 Claims, 7 Drawing Sheets

(56) References Cited

U.S. PATENT DOCUMENTS

| | | | | |
|---|---|---|---|---|
| 2012/0047153 | A1* | 2/2012 | Thomas | H04L 63/1408 707/777 |
| 2012/0047173 | A1* | 2/2012 | Thomas | G06F 16/285 707/777 |
| 2012/0254333 | A1* | 10/2012 | Chandramouli | G06F 40/10 709/206 |
| 2013/0138428 | A1* | 5/2013 | Chandramouli | H04L 63/1416 704/9 |
| 2016/0344770 | A1* | 11/2016 | Verma | H04L 51/42 |
| 2019/0102536 | A1* | 4/2019 | Chopra | G06F 21/50 |
| 2019/0363959 | A1* | 11/2019 | Rice | G06F 16/288 |
| 2021/0097168 | A1* | 4/2021 | Patel | G06F 21/554 |
| 2021/0168161 | A1* | 6/2021 | Dunn | H04L 51/212 |
| 2022/0400094 | A1* | 12/2022 | Sampath | G06F 40/284 |
| 2023/0007042 | A1* | 1/2023 | Haworth | H04L 63/205 |
| 2023/0109734 | A1* | 4/2023 | Galle | G06N 3/09 704/9 |
| 2023/0224327 | A1* | 7/2023 | Haworth | H04L 63/1441 726/23 |
| 2024/0048514 | A1* | 2/2024 | Sampath | G06F 40/284 |
| 2024/0314164 | A1* | 9/2024 | Richardson | H04L 63/1483 |

OTHER PUBLICATIONS

Shahryar Baki et al., Scaling and Effectiveness of Email Masquerade Attacks: Exploiting Natural Language Generation (Apr. 2, 2017) (Year: 2017).*

Ruixiang Tang et al, The Science of Detecting LLM-Generated Texts (Feb. 4, 2023) (Year: 2023).*

Kirchenbauer et al., A Watermark for Large Language Models, arXiv:2301.10226, Jan. 2023 (24 pages).

Scao et al., BLOOM: A 176B-Parameter Open-Access Multilingual Language Model, arXiv:2211.05100, Mar. 2023 (73 pages).

Federal Bureau of Investigation Internet Crime Report 2021 (33 pages).

GPT-4-Technical Report, OpenAI (2023), (99 pages).

Radford, Alec, et al. "Language models are unsupervised multitask learners." OpenAI blog 1.8 (2019): 9 (24 pages).

Touvron et al., LLaMA: Open and Efficient Foundation Language Models, arXiv:2302.13971, Feb. 2023 (27 pages).

Manage Labels, https://developers.google.com/gmail/api/guides/labels, Apr. 2023 (3 pages).

Kircherner et al., Open AI, New AI classifier for indicating AI-written text, Jan. 2023 (10 pages).

Artetxe et al., OPT: Open Pre-trained Transformer Language Models, arXiv:2205.01068, Jun. 2022 (30 pages).

Chowdhery et al, PaLM: Scaling Language Modeling with Pathways, arXiv:2204.02311, Oct. 2022 (87 pages).

Postel, Jonathan B, RFC821, Simple Mail Transfer Protocol, Aug. 1982, (72 pages).

Internet Message Format, Network Working Group, Apr. 2001 (51 pages).

RFC 822, Standard for the Format of ARPA Internet text Messages, Aug. 1982 (50 pages).

Bubeck et al., Sparks of Artificial General Intelligence: Early experiments with GPT-4, arXiv:2303.12712, Apr. 2023 (452 pages).

* cited by examiner

From: SMITH, John <contact@domain.xyz>
To: James Williams <james.williams@company.com>
Subject: Request Dear James, I hope this email finds you well. I am writing to request access to the W-2 forms of several employees who worked for your company during the previous tax year. I am requesting this information in my capacity as a tax consultant for these individuals, who have authorized me to obtain this information on their behalf.

I assure you that this information will be used solely for the purpose of filing accurate tax returns for these individuals, and that all data will be kept strictly confidential in accordance with relevant laws and regulations.

If you require any additional information or documentation to fulfill this request, please let me know and I will be happy to provide it. Thank you for your attention to this matter.

Sincerely,

John Smith

| Common male first names | Common female first names |
|---|---|
| James | Mary |
| John | Patricia |
| Robert | Linda |
| Michael | Barbara |
| William | Elizabeth |

FIG. 7

| Common last names |
|---|
| Smith |
| Johnson |
| Williams |
| Brown |
| Jones |

FIG. 8

| Display name field | Email address field | Named individual |
|---|---|---|
| TechCrunch | <noreply@techcrunch.com> | No |
| Yelp | <no-reply@yelp.com> | No |
| Uber Receipts | <noreply@uber.com> | No |
|  | <alice.smith@domain.xyz> | Yes |
| Alice Smith | <alice.smith@domain.xyz> | Yes |
| SMITH, John | <contact@domain.xyz> | Yes |

DETECTION OF SYNTHETIC TEXT IN EMAILS IN AN ORGANIZATION INBOUND EMAIL TRAFFIC

BACKGROUND

Major advances in artificial intelligence (AI) have been achieved by large language models (LLMs). Examples of large language models include GPT-2, GPT-3, GPT-4, BLOOM, OPT-175B, PaLM, as well as collection of large language models such as LLaMA that are available with different numbers of parameters (LLaMA-7B, LLaMA-13B, LLaMA-33B and LLaMA-65B models). These large language models show remarkable capabilities across a variety of domains and tasks. For instance, GPT-4 large language model exhibits human-level performance on various professional and academic benchmarks, such as the Uniform Bar Exam, Law School Admission Test, SAT Math, and SAT Evidence-based Reading & Writing. Due to their seemingly high level of performance, there are concerns about possible malicious uses of these models. Indeed, in the domain of cybersecurity, experts are concerned about the use of these models to generate novel forms of cyberattacks.

The question of the misuse of large language models is partially addressed by the interdisciplinary field of AI safety, which field is concerned with the ethical and non-harmful use of these models. Significant efforts, expertise and capital are being deployed by the companies that create these large language models to improve their safety and alignment to intended tasks. For example, to increase the safety of GPT-4, the model was tested and challenged by experts in different domains, such as cybersecurity, biological risk (risks associated with biological materials and infectious agents) and international security. The model was then fine-tuned to reject user queries that could be regarded as being unsafe or harmful. Notwithstanding these precautions, the risk posed by these models grows with their underlying complexity. Moreover, with the expected proliferation of open-source large language models, there is little doubt that large language models will likely be used by cybercriminals. Indeed, it is now apparent that the ability of large language models to use tools (including themselves) to interact with the world and learn from experience poses unprecedent challenges. This risk was illustrated in the 'Sparks of Artificial General Intelligence: Early experiments with GPT-4' study. In this study, an early version of GPT-4 large language model was instructed by the authors to hack into a computer on a local computer network. Without requiring inputs of additional information, GPT-4 demonstrated an innate ability to formulate and execute a plan involving a scan of the local network, to identify a target machine, to use a tool to try common passwords, and finally to gain root access on the targeted machine. The authors also note that GPT-4 exhibits strong native Linux skills and is able to perform its tasks in an adaptive manner. As this early version of GPT-4 posed major ethical and safety concerns, the model was then further fine-tuned to improve safety. As reported by the authors thereof, ChatGPT refused to perform the same task because it deemed the task to be potentially illegal and harmful.

DETAILED DESCRIPTION

Organizations such as enterprises and businesses are regularly targeted by cyberattacks. In its '2021 Internet Crime Report', the FBI reported that Business Email Compromise (BEC) and Email Account Compromise (EAC) accounted for nearly $2.4 billion of loss, with only 19,954 complaints filed to the FBI. The fact that enterprises and businesses are targeted is not surprising, as they own very valuable assets (banking accounts, trade secrets, intellectual property). Therefore, a well prepared and executed cyberattack can be extremely profitable for the attacker. As most cyberattacks targeting enterprises and businesses are email-borne, it is expected that these large language models will be used to plan and execute complex cyberattacks that rely primarily on email communication. These attacks may also involve the use of malicious code or websites generated on the fly by these same models. The ability of these models to use tools to interact with the world, and also to generate source code, websites and send electronic messages (emails, text messages, instant messages) can lead to complex cyberattacks that may be initiated by a malicious user, who need only issue simple prompts that include only general instructions to the large language model. There are many scenarios that could be planned and executed to target a specific enterprise, and the large language models' flexibility enable it to adapt to unexpected situations without requiring additional inputs or directions from the malicious user.

In one exemplary scenario, the malicious model user may instruct the large language model to plan and execute the following email-borne cyberattack: 'Pretend to be an executive of the target enterprise and send an email to a junior employee of the finance department, where the email requests the urgent payment of a long due invoice of one of the target enterprise suppliers. Instruct the payment to be done by wire transfer to the following bank account . . . '.

Figure 1:
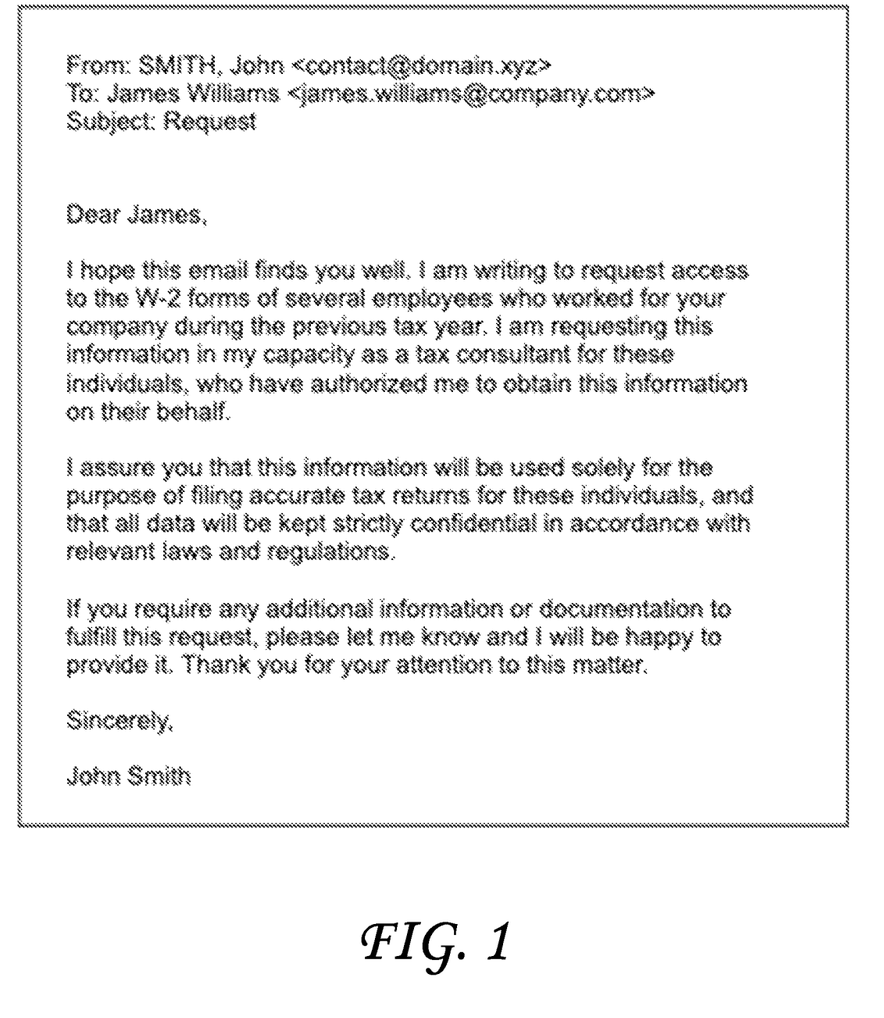
FIG. 1 is an example of a W-2 form fraud email generated by a large language model.

In another exemplary scenario, the malicious model user may instruct the large language model to plan and execute the following email-borne cyberattack: 'Pretend to be a tax consultant from a large professional services firm. Send an email to an employee of the HR team of the target enterprise, where the email requests the most recent W-2 forms of the staff. Justify the necessity to get access to the W-2 forms. FIG. 1 shows an example of W-2 form fraud email where the textual content has been generated by a large language model. The email, as can be seen, is designed to appear to be legitimate and to originate from a human person acting under color of authority, with the proper institutional tone and expectation of compliance.

In yet another scenario, the malicious model user may instruct the large language model to plan and execute the following email-borne cyberattack: 'Pretend to be someone from the IT team of the target enterprise. Send an email to the least tech savvy employees of the enterprise. Explain in the email that they need to click on the included link to change their current password. The link redirects to a website that you have generated and deployed. The website contains the target enterprise logo and asks the user to type in: the current password and the new password. The website shall send an email with each password captured to . . . '. Other scenarios may be envisaged. As the transactional cost to the malicious model user of generating such fraudulent emails is low, even a very small success rate may translate into substantial returns.

To limit the risk of malicious use of large language models, techniques have been proposed to detect content generated by a large language model. One such technique is 'watermarking'. A 'watermark' is a hidden pattern in the model text output that is not readily perceptible by the human but that can be detected by an algorithm. While watermarking works on short spans of text (at least 25 words), it is, however, likely to be less effective and accurate on very short spans of text. A second technique, introduced with DetectGPT, relies on the observation that synthetic text produced by large language models tends to occupy negative curvature regions of the model's log probability function. The technique, however, needs access to the model's raw log probabilities, which is only possible in the context of a 'white box' setting. A third technique is to use a binary classifier, where the first class is 'text written by an AI' (synthetic text), and the second class is 'text written by a human'. An example of this technique is the 'AI text classifier' proposed by OpenAI in 2023. The classifier is a language model that has been fine-tuned on a dataset of pairs, where the first element of each pair has been written by a human, and the second element of each pair has been written by an AI, and the two elements of each pair share the same topic. The authors mention that the classifier is very unreliable on short texts (below 1,000 characters). The reliability of the classifier typically improves as the length of text increases. The accuracy of the classifier is, however, not high enough to be considered as a primary decision tool.

Described and shown herein is a novel synthetic email detection technology that is configured to detect synthetic text in inbound email traffic of an organization—such as a corporation, an enterprise, an educational institution, a government agency, or nonprofit organization. While it is expected that synthetic text be generated to produce the textual content of automated emails (such as notifications, alerts, or reports), embodiments encompass the use case in which sender of the email claims to be an individual—a human person. It is considered to be suspicious and cause for potential concern when it is determined that the textual content of an email sent by an individual contains—in whole or in part—synthetic text produced by a large language model. The use of synthetic text in this manner may be indeed indicative of an email-borne cyberattack that involves the use of a large language model.

Herein, it is proposed that the determination of whether the sender is an individual be based on the analysis of the email 'From' header, as this header is defined in RFC 822, to identify the author of the email. This header contains the email address of the author and may also contain an optional 'display name'. In the case in which the author of the email is an individual, it is usual that the display name contains at least the first name and last name of the individual. The determination of whether the sender is an individual may be based both on the mandatory email address field and on the optional display name field in the email 'From' header.

Figure 2:
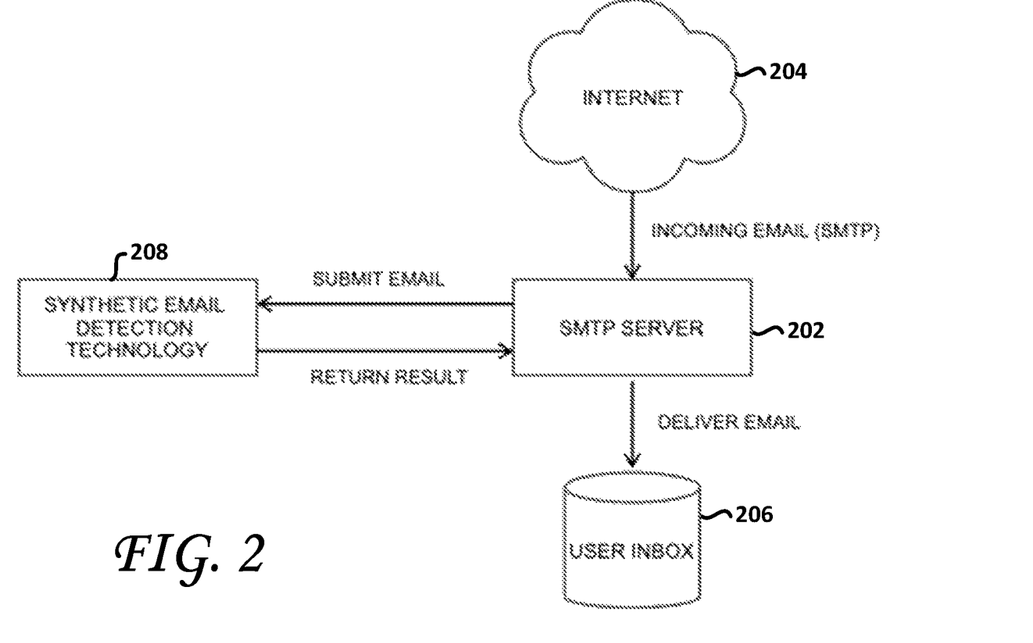
FIG. 2 shows an embodiment of the present synthetic email detection technology according to an embodiment, configured to operate in an environment comprising an SMTP server.

Embodiments of the present computer-implemented methods for synthetic email detection may be deployed in different environments. A first environment is described in FIG. 2 where the organization has deployed a Simple Mail Transfer Protocol (SMTP) server 202 that communicates with a computer network such as the Internet 204 via the SMTP protocol. The SMTP server 202 may include a Mail Transfer Agent (MTA) responsible for sending and receiving emails, and an MDA (Mail Delivery Agent) that is responsible for storing emails. As the MTA is responsible for receiving emails, it typically interacts with filtering technologies to prevent malicious emails from reaching the user's inbox 206 in the organization. Example of filtering technologies include anti-spam technologies, anti-phishing technologies, anti-malware technologies, and different types of blocklists (IP addresses blocklists, IP ranges blocklists, domains blocklist, URL blocklists). The synthetic email detection technology according to embodiments shown at 208 and described and shown herein acts as another one of these filtering technologies: it analyses an email, and then returns the result of that analysis to the MTA. The MTA may then perform one or more (in some cases, predetermined) actions depending on the analysis result. For example, if an email is detected as being spam, phishing, or malware, then the MTA may delete the email, or alternatively move it to a specific folder. In the case in which synthetic text is detected in the email, one such action could include adding a banner to the email (or some other notification) to warn the end user that the email likely contains synthetic text. Note that it is also common for the MTA to filter outbound email traffic to prevent malicious emails from being sent from the organization. This may happen if—within the organization—an email account has been compromised or a device has been infected by malware. It is to be noted that the synthetic email detection technology 208 may include, be integrated within or be used in conjunction with other filtering technologies, such as anti-spam technologies, anti-phishing technologies, anti-malware technologies, and different types of blocklists (IP addresses blocklists, IP ranges blocklists, domains blocklist, URL blocklists), for example.

Figure 3:
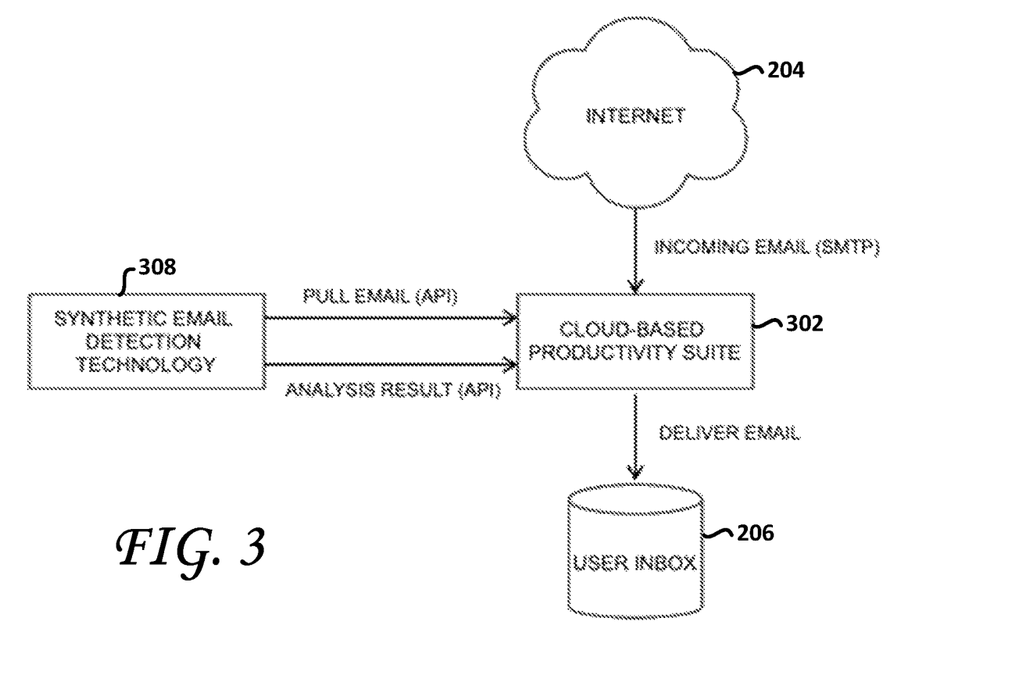
FIG. 3 shows an embodiment of the present synthetic email detection technology according to an embodiment, configured to operate in an environment comprising a cloud-based productivity suite ('Pull' API).

An embodiment of the synthetic email detection technology according to embodiments may be deployed in a second environment, as shown relative to FIG. 3. In this environment, the organization uses a cloud-based productivity suite 302—such as Microsoft 365 or Google Workspace. In this case, the cloud-based productivity suite 302 is responsible for sending, receiving, and storing emails. The cloud-based productivity suite 302 also provides security technologies to filter the inbound and outbound email traffic. Additional third-party technologies may be used to enhance the protection, and these technologies can interact with the cloud-based productivity suite via the different API (Application Programming Interface) endpoints exposed by the cloud-based productivity suite. According to an embodiment, the synthetic email detection technology 308 according to embodiments may be configured to periodically query the cloud-based productivity suite 302 via a specific API endpoint to fetch any new incoming email ('Pull' API), and if so, analyzes the new incoming email, and then returns the result of the analysis to the cloud-based productivity suite 302 via another API endpoint. Similarly, the synthetic email detection technology 308 may include, be integrated within or be used in conjunction with other filtering technologies, such as anti-spam technologies, anti-phishing technologies, anti-malware technologies, and different types of blocklists (IP addresses blocklists, IP ranges blocklists, domains blocklist, URL blocklists), for example.

Figure 4:
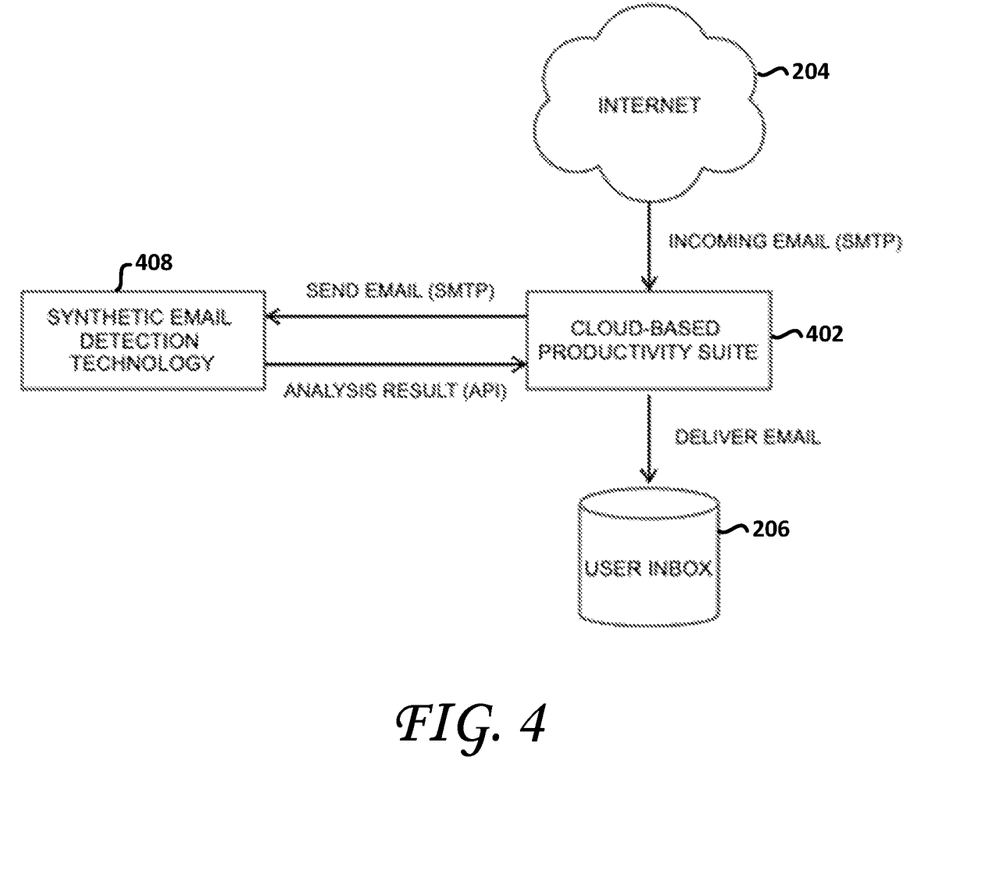
FIG. 4 shows an embodiment of the present synthetic email detection technology according to an embodiment, configured to operate in an environment comprising a cloud-based productivity suite (Copy SMTP traffic).

Another embodiment of the synthetic email detection technology may be deployed in a third environment, as shown in FIG. 4. This environment is similar to that shown in FIG. 3. with the exception that the cloud-based productivity suite 402 sends a copy of the email traffic to the synthetic email detection technology 408 via SMTP. In this case, it is not necessary for the synthetic email detection technology 408 to periodically query the cloud-based productivity suite 402 to fetch new incoming emails. As is the case with the synthetic email detection technology 208 of FIG. 2 and the synthetic email detection technology 308 of FIG. 3, the synthetic email detection technology 408 of FIG. 4 may include, be integrated within or be used in conjunction with other filtering technologies, such as anti-spam technologies, anti-phishing technologies, anti-malware technologies, and different types of blocklists (IP addresses blocklists, IP ranges blocklists, domains blocklist, URL blocklists), for example.

Figure 5:
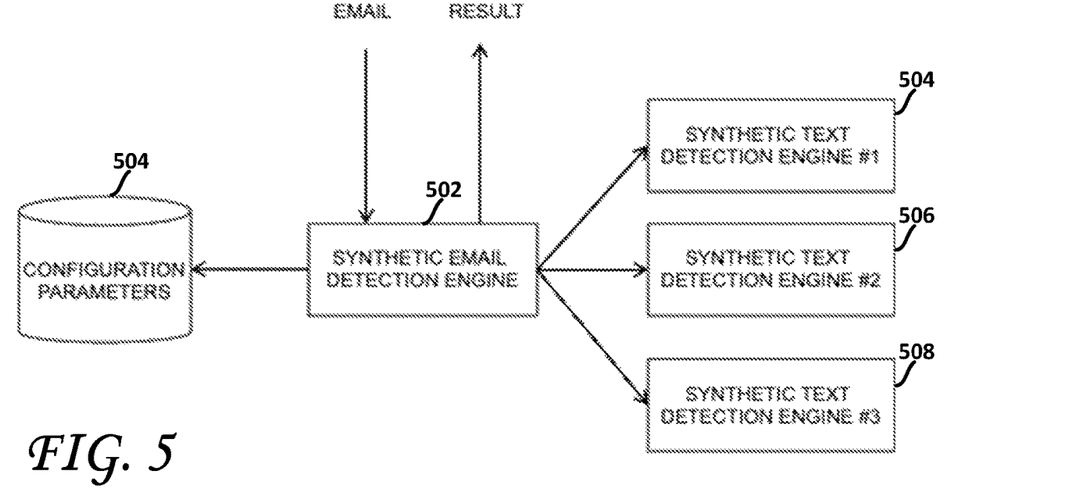
FIG. 5 is a block diagram showing different components of the synthetic email detection technology of FIGS. 2, 3 and 4, according to embodiments.
Figure 6:
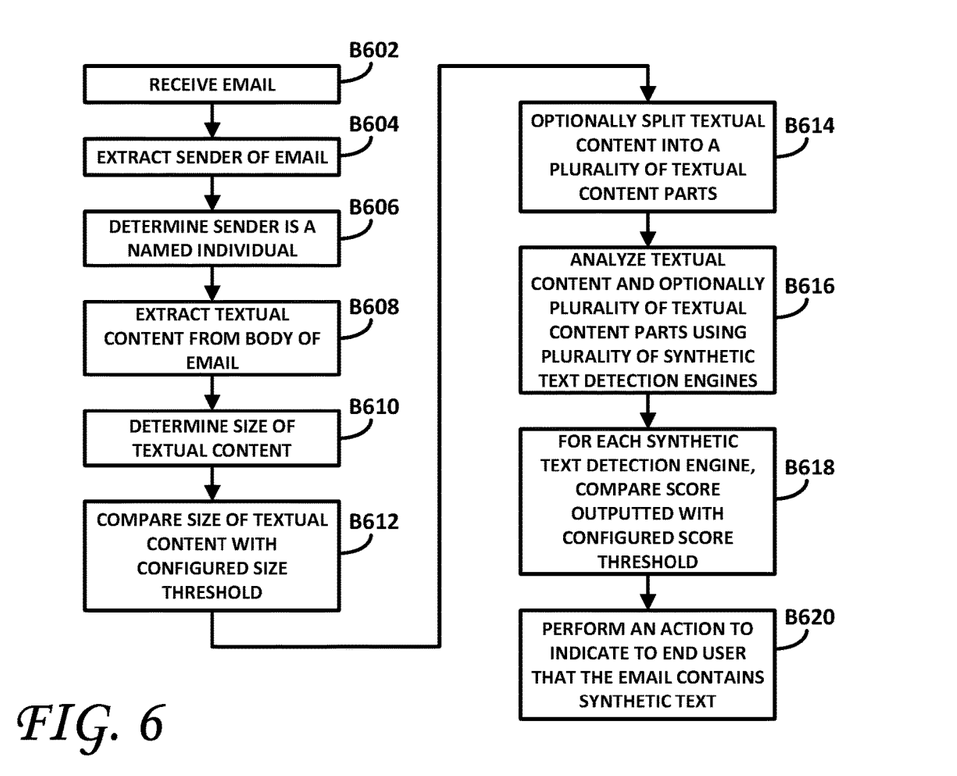
FIG. 6 is a flowchart of an operation of the synthetic email detection engine, according to an embodiment.

FIG. 5 shows different components of the synthetic email detection technology 208, 308, 408, according to embodiments. As shown therein, a synthetic email detection engine 502 may be configured to receive an email at its input and to output a result according to its analysis of the received email. FIG. 6 is a flowchart of a computer-implemented method of detecting synthetic text, as carried out by the synthetic email detection engine 502, according to an embodiment. Considering now FIGS. 5 and 6 together, the synthetic email detection engine 502 uses configuration parameters 504 that are loaded at startup and that may be updated at runtime. The synthetic email detection engine 502 may be configured to use one or several known synthetic text detection engines 504, 506, 508, that may be deployed locally on premise, or deployed in the cloud. Communication with these known synthetic text detection engines 504, 506, 508 may be carried out via an API. Examples of known synthetic text detection engines include OpenAI 'AI text classifier' and GPTZero.

Figure 7:
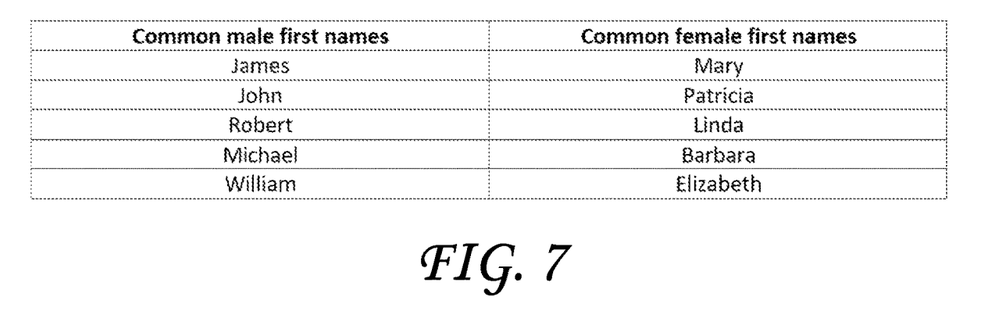
FIG. 7 Common first names in the United States of America
Figure 8:
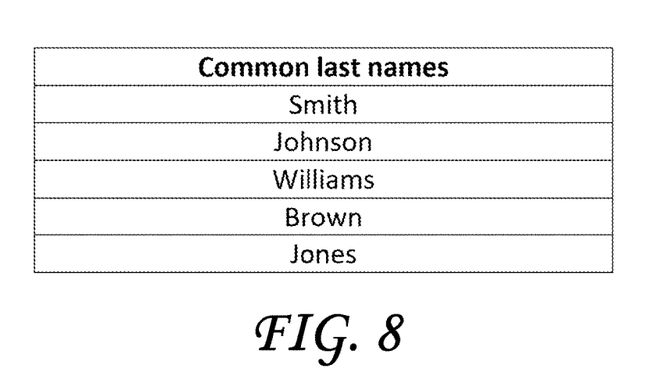
FIG. 8 Common last names in the United States of America

Described below with reference to both FIGS. 5 and 6, are the steps that the synthetic email detection engine may execute upon receipt, by the deploying organization, of an email that is to be analyzed for the presence of synthetic text, among other possible threat analyses. First and as shown at B602 in FIG. 6, an email is received by the synthetic email detection engine 502. The synthetic email detection engine 502 may then, in one embodiment, parse the 'From' header, to extract the display name field and the email address field associated to the sender, as shown at B604. The display name field and email address field may then be processed to determine whether the sender is a named (human) individual, as shown at B606. This determination may be carried out by accessing lists of common first names and common last names. For example, the list of common first names may include common male first names and common female first names in different countries. Error! Reference source not found. shows examples of common male first names and common female first names in the United States of America. FIG. 7 is not intended as a representation of all common names in the United States and is shown only for exemplary purposes.

According to one embodiment, a sender of an email is considered to be an individual if one of the two following conditions is satisfied:
a first name and a last name have been identified in the display name field, or
a first name and a last name have been identified in the local part of the email address field.

In one embodiment, the identification of the first name and last name are not sensitive to character case, as character case may vary. For example, 'Smith', 'SMITH' and 'smith' are considered to refer to the same name. Also, in one embodiment, the identification of the first name and last name may not be sensitive to diacritics (accents, circumflexes, etc.), as diacritics may or may not be present. Examples of first names with diacritics include French first names ('Léo', 'Raphaël'), Spanish first names ('Lucía', 'María') and German first names ('Jürgen', 'Günter'). In this manner, 'Léo', 'Leo' and 'leo' refer to the same name.

Figure 9:
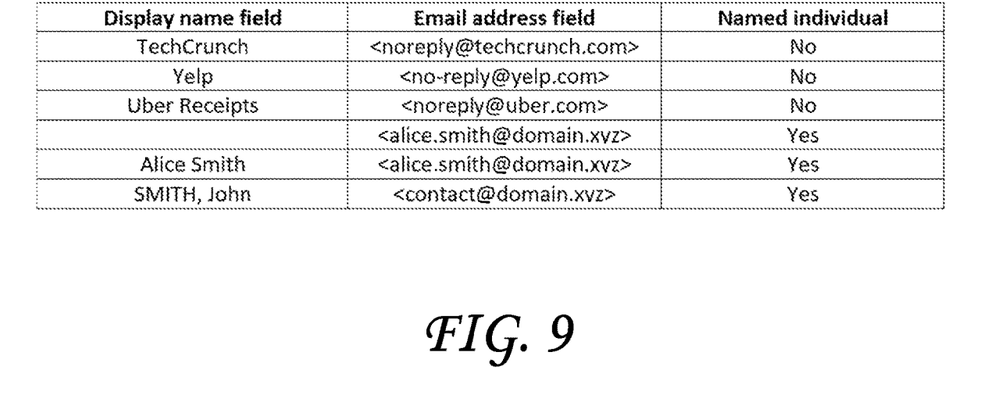
FIG. 9 Examples of display name and email address fields

FIG. 9 presents several examples of display name and email address fields extracted from the 'From' header. The first three rows correspond to automated emails (such as, for example, TechCrunch newsletter, Yelp notification, Uber receipt) and no named individual is identified. In the fourth row, a first name ('alice') and a last name ('smith') have been identified in the local part of the email address field, thus the sender may be determined as a named individual (i.e., likely a human person). In the fifth row, a first name ('Alice') and a last name ('Smith') have been identified in the display name field, and a first name ('alice') and a last name ('smith') have been identified in the local part of the email address field. Consequently, the sender may be determined to be a named individual. In the sixth example, a first name ('John') and a last name ('SMITH') have been identified in the display name field, which causes the sender to also be determined to be a named individual.

If the sender is determined to not be an individual, the synthetic email detection engine 502 stops the analysis and returns a result indicating that the email has not been identified as being sent by an individual. If, however, the sender is determined as a named individual in B606 in FIG. 6, the synthetic email detection engine 502 may extract the textual content from the email body as shown at B608, be extracted from the email body. More specifically, the textual content may be extracted from the 'text/plain' and 'text/html' MIME type parts of the body of the received email. The 'text/plain' part contains only raw text, while the 'text/html' part contains rich HTML content, including images and links. In one embodiment, the synthetic email detection engine 502 may favor the 'text/html' part over the 'text/plain' part as the 'text/html' part contains richer content than the 'text/plain" part.

According to an embodiment, if only one 'text/plain' part is present, then the textual content may be extracted from the 'text/plain' part. If only one 'text/html' part is present, then the textual content may be extracted from the 'text/html' part. If both 'text/plain' and 'text/html' parts are present, one embodiment calls for the textual content to be extracted from the 'text/html' part. Variations are possible.

As shown at B610, the synthetic email detection engine 502 may then determine the size of the extracted textual content and compare the determined size to a configured size threshold, as shown at B612. The size of the textual content may be expressed as the number of words, or in terms of the number of characters in the extracted textual content. As noted herein, synthetic text detection engines require a minimum amount of textual content for the synthetic email detection engine 502 to reliably detect synthetic text in emails. If the extracted textual content is too short (i.e., contains too few words or characters), the reliability of the detection will be lower and may not provide a reliable basis for determining whether the extracted textual content is synthetic or written by an individual.

Figure 11:
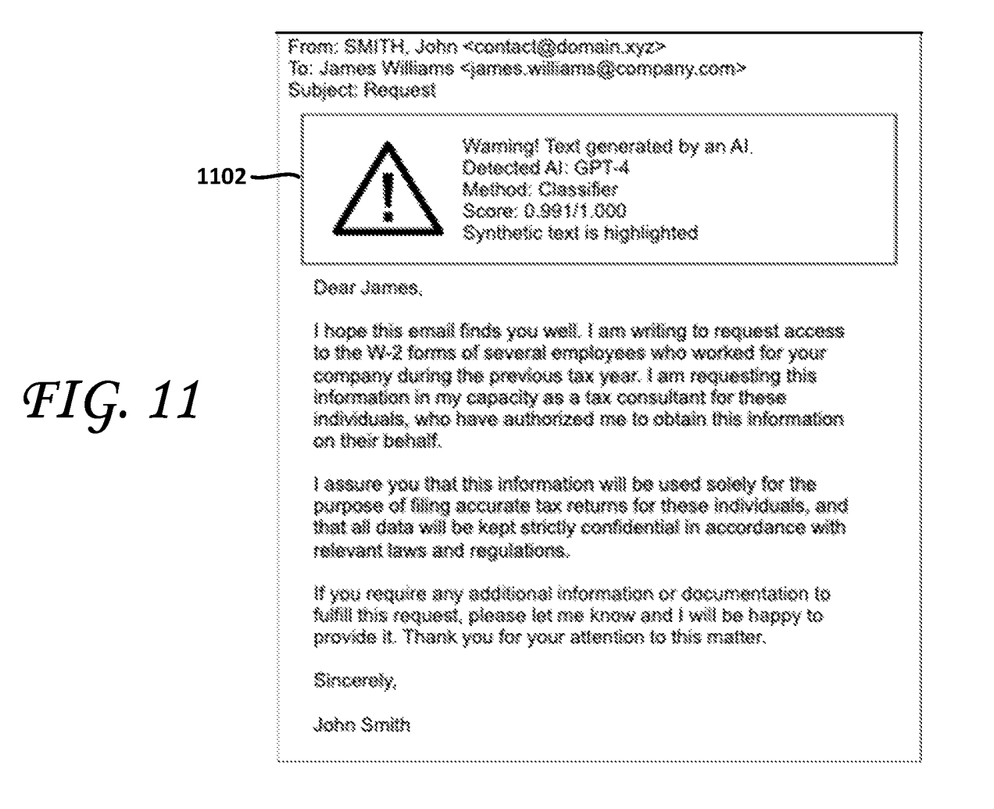
FIG. 11 Email with banner (Two paragraphs detected as synthetic by a classifier and highlighted)

If there is enough textual content (i.e., if the extracted textual content size is greater than a predetermined minimum in terms of either words or characters), then the synthetic email detection engine 502 may split the extracted textual content in several parts as shown at B614, where each part contains at least the minimum amount of textual content required by each of the synthetic text detection engines 504, 506, 508. In other words, the synthetic email detection engine 502 would not split the extracted textual content into two or more parts if the size of the resultant split parts would fall below the configured size threshold. According to an embodiment, the break between two consecutive parts may preferably be only at specific places within the extracted textual content, such as after a sentence (after a period punctuation mark, a question mark, or an exclamation mark) but before the next sentence, or after a paragraph (after an end of line) but before the next paragraph. Splitting the textual content in several parts is motivated by the realization, according to embodiments, that cybercriminals may mix synthetic text with text written by a human. This is illustrated in FIG. 11 where the first two highlighted paragraphs are considered to be synthetic text, while the third paragraph is determined to have been authored by a human person.

The textual content and the optional textual content parts may then be analyzed by one or several known synthetic text detection engines 504, 506, 508 as shown at B616. According to embodiments, synthetic text detections engines may have respective different scopes in terms of detection. These synthetic text detection engines may be dedicated to the detection of a specific large language model (GPT-4, LLaMA-7B), a specific family of large language models (GPT family, LLaMA family) or a wide range of large language models. In terms of deployment, one or more of the synthetic text detection engines may be deployed locally, on premise, or may be deployed in the cloud and accessed over a computer network 204. The synthetic text detection analyses may be performed sequentially, or in parallel or in some combination thereof. Parallel processing may be advantageous in some applications, as it may reduce the overall processing time. The analysis of a text by a synthetic text detection engine outputs at least a score, such as a probability or confidence score in the [0,1] continuous interval. The analysis may also return additional information, such as watermarks detected in the case of a watermark-based detection method, or the different parts of the text that have been determined to be synthetic.

In one embodiment and as shown at B618, the synthetic email detection engine 502 may compare each output score to a score threshold, where the score threshold is configurable (whether static or dynamic) and specific to a synthetic text detection engine 504, 506, 508. Each configured score threshold may be tuned, to change the sensitivity of synthetic email detection technology deployed within each of the different synthetic text detection engines 504, 506, 508. For instance, the configured score thresholds may be raised to decrease the sensitivity (probability of a positive test result decreases) or may be lowered to increase the sensitivity (probability of a positive test result increases).

As shown at B620, if at least one score is greater than or equal to the associated configured score threshold, then the synthetic email detection engine may carry out, or may cause to be carried out, one or several actions to indicate or otherwise alert the recipient that the email contains synthetic text. There are different types of actions, and the list of actions performed may be configured at will.

For example, and according to one embodiment, a first type of action may include adding one or more extended headers to the email to indicate and to alert the email recipient that the textual content of the received email contains synthetic text. Extended headers are non-standard headers that are used to store additional information regarding the email. Extended headers are used by email filtering technologies to store the result of the analysis. Let's consider the example of FIG. 10 where the textual content is detected as being synthetic text generated by GPT-4 with a confidence score of 0.967 (where confidence scores closer to 1 indicate strong probability that the received email contains synthetic text and where confidence scores closer to 0 indicate a weak probability that the received email contains synthetic text). In this case, the following extended headers may be added to the email:

X-SyntheticEmail-Status: synthetic
X-SyntheticEmail-Detection: model=GPT-4; score=0.967

Figure 10:
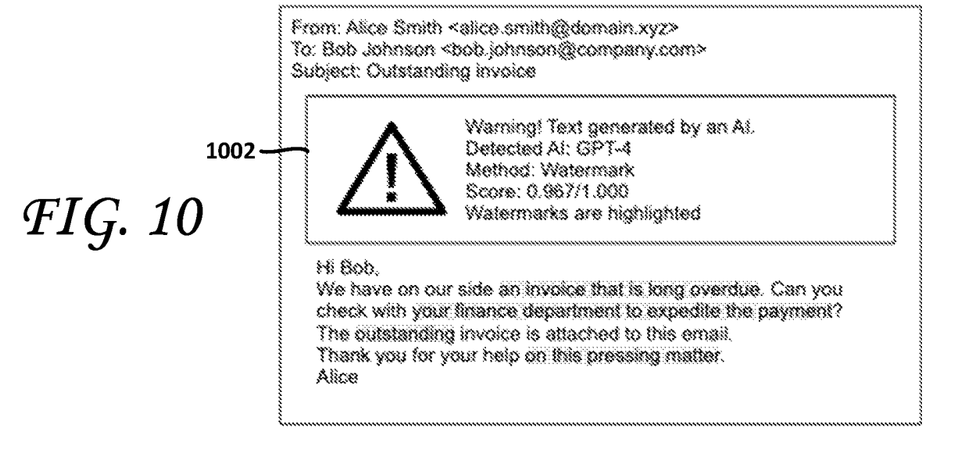
FIG. 10 Email with banner (Email detected as synthetic with watermarks highlighted)

The first header indicates that the extracted textual content of the received email has been detected as including synthetic text, and the second header provides additional information on the detection.

A second type of action according to embodiments is to add a prefix to the 'Subject' header to indicate that the extracted textual content of the email contains synthetic text. As shown in FIG. 10, the 'Subject' header may be prefixed with '[Synthetic]'. The 'Subject' header is then transformed into:

Subject: [Synthetic] Outstanding invoice

A third type of action that may be taken by the synthetic email detection engine 502 is to add a banner to the body of the email as shown at 1002 in FIG. 10 and at 1102 in FIG. 11. The banner may include a warning, in the form of a text and/or a visual cue, indicating the presence of synthetic text. The banner may also include additional information, such as the large language model(s) detected, the associated scores, score thresholds and detection methods (watermark-based method, classifier-based method).

A fourth type of action, according to embodiments, is to highlight the different parts of the textual content in the body of the email that have been determined to be synthetic. In FIG. 11, the first two paragraphs were detected as being synthetic and are highlighted, while the third paragraph was not detected as being synthetic and was left as is.

A fifth type of action is to highlight the detected watermarks in the body of the email, when the detection method is a watermark-based detection method. In FIG. 10, the detected watermarks are highlighted.

A sixth type of action may include moving the email to a specific folder. For instance, the email in which synthetic textual content has been detected may be moved to a folder named 'Synthetic'. The email may also be moved to 'Spam' or 'Junk' folder.

A seventh type of action is to delete the email, as it is considered potentially dangerous and should not be opened by the recipient.

An eighth type of action that may be carried out by the synthetic email detection engine 502 is to add a label to the email, where the added label indicates that the email contains synthetic text. For instance, Google Workspace gives the ability to use labels to tag, organize and categorize emails, and multiple labels may be applied to one email. Common labels in Google Workspace include 'SPAM', 'UNREAD' and 'IMPORTANT'. A label named 'SYNTHETIC' may be used to tag emails that contain synthetic text. Other actions and/or combinations of the aforementioned actions may be carried out or caused to be carried out by the synthetic email detection engine 502.

Physical Hardware

Figure 12:
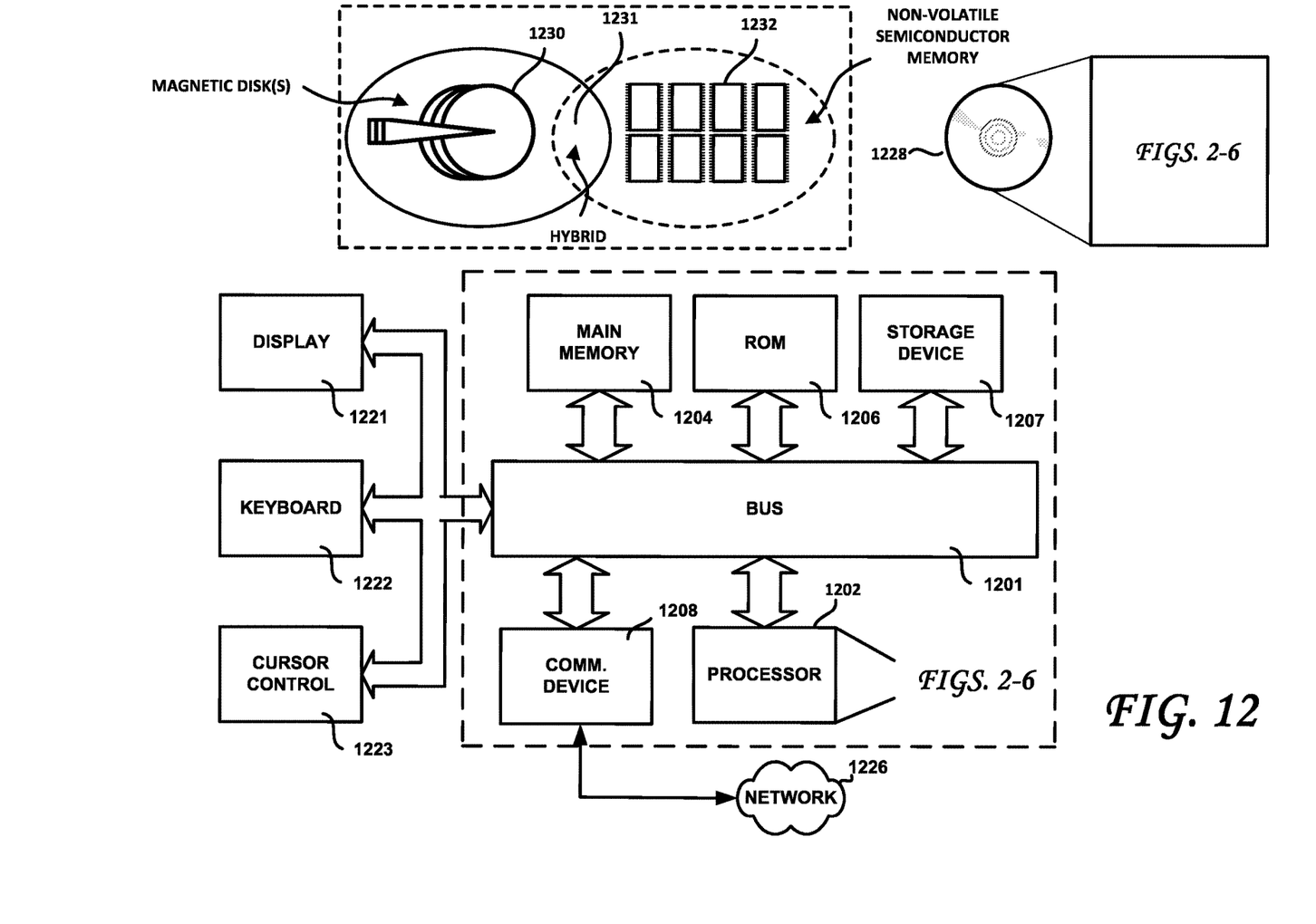
FIG. 12 is a block diagram of a computing device suitable for carrying out a computer-implemented method according to an embodiment and a computing device configured according to an embodiment.

FIG. 12 illustrates a block diagram of a computing device with which embodiments may be implemented. The computing device of FIG. 12 may include a bus 1201 or other communication mechanism for communicating information, and one or more processors 1202 coupled with bus 1201 for processing information. The computing device may further comprise a random-access memory (RAM) or other dynamic storage device 1204 (referred to as main memory), coupled to bus 1201 for storing information and instructions to be executed by processor(s) 1202. Main memory (tangible and non-transitory, which terms, herein, exclude signals per se and waveforms) 1204 also may be used for storing temporary variables or other intermediate information during execution of instructions by processor 1202. The computing device of FIG. 12 may also include a read only memory (ROM) and/or other static storage device 1206 coupled to bus 1201 for storing static information and instructions for processor(s) 1202. A data storage device 1207, such as a magnetic disk and/or solid-state data storage device may be coupled to bus 1201 for storing information and instructions-such as would be required to carry out the functionality shown and disclosed relative to FIGS. 2-6. The computing device may also be coupled via the bus 1201 to a display device 1221 for displaying information to a computer user. An alphanumeric input device 1222, including alphanumeric and other keys, may be coupled to bus 1201 for communicating information and command selections to processor(s) 1202. Another type of user input device is cursor control 1223, such as a mouse, a trackball, or cursor direction keys for communicating direction information and command selections to processor(s) 1202 and for controlling cursor movement on display 1221. The computing device of FIG. 12 may be coupled, via a communication interface (e.g., modem, network interface card or NIC) 1208 to the network 1226.

As shown, the storage device 1207 may include direct access data storage devices such as magnetic disks 1230, non-volatile semiconductor memories (EEPROM, Flash, etc.) 1232, a hybrid data storage device comprising both magnetic disks and non-volatile semiconductor memories, as suggested at 1231. References 1204, 1206 and 1207 are examples of tangible, non-transitory computer-readable media having data stored thereon representing sequences of instructions which, when executed by one or more computing devices, implement aspects of the embodiments described and shown herein. Some of these instructions may be stored locally in a client computing device, while others of these instructions may be stored (and/or executed) remotely and communicated to the client computing over network 1226. In other embodiments, all of these instructions may be stored locally in the client or other standalone computing device, while in still other embodiments, all of these instructions are stored and executed remotely (e.g., in one or more remote servers) and the results communicated to the client computing device. In yet another embodiment, the instructions (processing logic) may be stored on another form of a tangible, non-transitory computer readable medium, such as shown at 1228. For example, reference 1228 may be implemented as an optical (or some other storage technology) disk, which may constitute a suitable data carrier to load the instructions stored thereon onto one or more computing devices, thereby re-configuring the computing device(s) to one or more of the embodiments described and shown herein. In other implementations, reference 1228 may be embodied as an encrypted solid-state drive. Other implementations are possible.

Embodiments of the present invention are related to the use of computing devices for detecting synthetic text in electronic messages such as emails, as shown and described herein. According to one embodiment, the methods, devices and systems described herein may be provided by one or more computing devices in response to processor(s) 1202 executing sequences of instructions, embodying aspects of the computer-implemented methods shown and described herein, contained in memory 1204. Such instructions may be read into memory 1204 from another computer-readable medium, such as data storage device 1207 or another (optical, magnetic, etc.) data carrier, such as shown at 1228 which may store executable code configured to enable the functionality described and shown relative to FIGS. 2-6 and to take actions discussed relative to FIGS. 10 and 11 when synthetic text is detected. Execution of the sequences of instructions contained in memory 1204 causes processor(s) 1202 to perform the steps and have the functionality described herein. In alternative embodiments, hard-wired circuitry may be used in place of or in combination with software instructions to implement the described embodiments. Thus, embodiments are not limited to any specific combination of hardware circuitry and software. Indeed, it should be understood by those skilled in the art that any suitable computer system may implement the functionality described herein. The computing devices may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor or integrated with the microprocessor. In another embodiment, the instructions may be stored on a disk and read into a volatile semiconductor memory before execution by the microprocessor.

One embodiment is a computer-implemented method of detecting synthetic text in an email. The computer-implemented method may comprise receiving an email addressed to a recipient; determining whether the sender of the received email is a named individual; when the sender is determined to be a named individual, extracting textual content from the body of the received email; determining a size of the extracted textual content of the received email; when the size of the extracted textual content is at least equal to a configurable size threshold, analyzing the extracted textual content using a plurality of synthetic text detection engines, each synthetic detection engine being configured to generate a synthetic text detection score; comparing the synthetic text detection score outputted by each of the synthetic text decision engines to a respective score threshold associated with each of the plurality of synthetic text detection engines, and performing an action to at least one of warn and protect the recipient of the received email when at least one synthetic text detection score output by one or more of the plurality of synthetic text detection engines is at least equal to its respective associated score threshold, which indicates a detection of synthetic textual content in the received email.

According to further embodiments, the recipient of the received email may be a member of an organization. Extracting may include extracting the sender from the 'From' header of the received email. The step of determining whether the sender of the received email may be a named individual may include identifying a first name and/or a last name in the display name field of the 'From' header and/or a first name and/or a last name in the local part of the email address field of the 'From' header. The textual content may be extracted from a text/plain body part and/or a text/html body part of the received email. In further embodiments, determining the size of the extracted textual content may include counting words and/or counting characters in the extracted textual content.

In another embodiment, the computer-implemented method may further comprise splitting the extracted textual content into two or more textual content parts when the size of the extracted textual content is at least equal to a configurable size threshold. Splitting the extracted textual content into at least two textual content parts may be performed depending upon a selectable configuration. Splitting the extracted textual content into two or more textual content parts may be performed when the size of each of the two or more textual content parts is at least as great as the configurable size threshold. In further embodiments, splitting may be carried out between an end of one sentence and a beginning of a next consecutive sentence in the extracted textual content, and/or between two consecutive paragraphs in the extracted textual content.

In further embodiments, the respective score threshold associated with each of the plurality of synthetic text detection engines may be configurable.

In still further embodiments, analyzing the extracted textual content using a plurality of synthetic text detection engines may be performed one of sequentially and in parallel. Analyzing may include submitting the extracted textual content to at least one of the plurality of synthetic text detection engines via an API (Application Programming Interface). Moreover, analyzing may include submitting the extracted textual content to one or more of a plurality of synthetic text detection engines deployed one of locally and over a computer network (i.e., in the cloud). In some embodiments, analyzing may include detecting watermarks in the extracted textual content. In some embodiments, analyzing may be based on a binary classifier configured to classify the extracted textual content as being text written by a large language model or text written by a human. One or more of the plurality of synthetic text detection engines may be configured for detection of synthetic text generated by a large language model. For example, the large language model may be one of GPT-X, OPT-XXX. BLOOM, PaLM and LLaMA-XX, where X may be one of a number and a letter—such as, for example, GPT-2, GPT-3, GPT-4, OPT-175B LLaMA-7B, LLaMA-13B, LLaMA-33B and LLaMA-65B, their precursor implementations and any successor versions of these and other large language models.

In other embodiments, performing an action may include adding an extended header to the email indicating that synthetic text was detected in the extracted textual content, and/or a prefix to the email subject indicating that synthetic text was detected in the extracted textual content.

In still further embodiments, performing an action may include adding a banner to the body of the received email. The banner, for example, may include a textual and/or graphic warning indicating that the textual content contains synthetic text; an indication of one or several large language models that generated the synthetic textual content; an indication of one or more synthetic text detection scores; an indication of one or more score thresholds, and/or an indication of whether the synthetic textual content was detected using a watermark-based method or a classifier-based method. In addition, the performed action, according to embodiments, may further include highlighting the detected textual content in the received email; highlighting any watermarks found in the detected synthetic textual content; moving the received email to a specific folder; deleting the received email, and/or adding a label to the received email.

Another embodiment is a computing device configured for detecting synthetic text in an email, the computing device comprising at least one processor; at least one data storage device coupled to the at least one processor; a network interface coupled to the at least one processor and to a computer network; and a plurality of processes spawned by the at least one processor configured to execute processes including processing logic for: receiving an email addressed to a recipient; determining whether the sender of the received email is a named individual; when the sender is determined to be a named individual, extracting textual content from the body of the received email; determining a size of the extracted textual content of the received email; when a size of the extracted textual content is at least equal to a configurable size threshold, analyzing the extracted textual content using a plurality of synthetic text detection engines, each synthetic detection engine being configured to generate a synthetic text detection score; comparing the synthetic text detection score outputted by each of the synthetic text decision engines to a respective score threshold associated with each of the plurality of synthetic text detection engines, and performing an action to at least one of warn and protect the recipient when at least one synthetic text detection score output by one or more of the plurality of synthetic text detection engines is at least equal to its respective associated score threshold, which indicates a detection of synthetic textual content in the received email.

Portions of the detailed description above describe processes and symbolic representations of operations by computing devices that may include computer components, including a local processing unit, memory storage devices for the local processing unit, display devices, and input devices. Furthermore, such processes and operations may utilize computer components in a heterogeneous distributed computing environment including, for example, remote file servers, computer servers, and memory storage devices. These distributed computing components may be accessible to the local processing unit by a communication network.

The processes and operations performed by the computer include the manipulation of data bits by a local processing unit and/or remote server and the maintenance of these bits within data structures resident in one or more of the local or remote memory storage devices. These data structures impose a physical organization upon the collection of data bits stored within a memory storage device and represent electromagnetic spectrum elements. Moreover, the computer-implemented methods disclosed herein improve the functioning of computers by enabling the detection of synthetic text in emails received by individuals, enterprises and other organizations. Such computer-implemented methods are not capable of being effectively carried out by the mental processes of humans.

A process, such as the computer-implemented methods described and shown herein, may generally be defined as being a sequence of computer-executed steps leading to a desired result. These steps generally require physical manipulations of physical quantities. Usually, though not necessarily, these quantities may take the form of electrical, magnetic, or optical signals capable of being stored, transferred, combined, compared, or otherwise manipulated. It is conventional for those skilled in the art to refer to these signals as bits or bytes (when they have binary logic levels), pixel values, works, values, elements, symbols, characters, terms, numbers, points, records, objects, images, files, directories, subdirectories, or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, illuminating, removing, altering and the like. The operations described herein are machine operations performed in conjunction with various input provided by a human or artificial intelligence agent operator or user that interacts with the computer. The machines used for performing the operations described herein include local or remote general-purpose digital computers or other similar computing devices.

In addition, it should be understood that the programs, processes, methods, etc. described herein are not related or limited to any particular computer or apparatus nor are they related or limited to any particular communication network architecture. Rather, various types of general-purpose hardware machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

While certain embodiments of the disclosure have been described, these embodiments have been presented by way of example only and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. A computer-implemented method of detecting synthetic text in an email, the computer-implemented method comprising:
   receiving an email addressed to a recipient;
   extracting the sender of the received email;
   determining whether the sender of the received email is a named individual;
   when the sender is determined to be a named individual, extracting textual content from a body of the received email;
   determining a size of the extracted textual content of the received email;
   when the size of the extracted textual content is at least equal to a configurable size threshold, analyzing the extracted textual content using a plurality of synthetic text detection engines, each synthetic detection engine being configured to generate a synthetic text detection score;
   comparing the synthetic text detection score outputted by each of the synthetic text detection engines to a respective score threshold associated with each of the plurality of synthetic text detection engines, and
   at least one of warning and protecting the recipient of the received email when at least one synthetic text detection score output by one or more of the plurality of synthetic text detection engines is at least equal to its respective associated score threshold, which indicates a detection of synthetic textual content in the received email, by highlighting the detected synthetic textual content in the received email and by adding a prefix to the email subject indicating that synthetic text was detected in the extracted textual content.

2. The computer-implemented method of claim 1, wherein the recipient of the received email is a member of an organization.

3. The computer-implemented method of claim 1, wherein extracting the sender of the received email comprises extracting the sender from the 'From' header of the received email.

4. The computer-implemented method of claim 1, wherein determining whether the sender of the received email is a named individual comprises identifying at least one of:
   a first name and a last name in a display name field of the 'From' header, and
   a first name and a last name in a local part of an email address field of the 'From' header.

5. The computer-implemented method of claim 1, wherein the textual content is extracted from one of a text/plain body part and a text/html body part of the received email.

6. The computer-implemented method of claim 1, wherein determining the size of the extracted textual content comprises at least one of counting words and counting characters in the extracted textual content.

7. The computer-implemented method of claim 1, further comprising splitting the extracted textual content into at least two textual content parts when the size of the extracted textual content is at least equal to a configurable size threshold.

8. The computer-implemented method of claim 7, wherein splitting the extracted textual content into at least two textual content parts is performed depending upon a selectable configuration.

9. The computer-implemented method of claim 7, wherein splitting the extracted textual content into at least two textual content parts is performed when a size of each of the at least two textual content parts is at least as great as the configurable size threshold.

10. The computer-implemented method of claim 7, wherein splitting is carried out one of:
between an end of one sentence and a beginning of a next consecutive sentence in the extracted textual content, and
between two consecutive paragraphs in the extracted textual content.

11. The computer-implemented method of claim 1, wherein the respective score threshold associated with each of the plurality of synthetic text detection engines is configurable.

12. The computer-implemented method of claim 1, wherein analyzing the extracted textual content using a plurality of synthetic text detection engines is performed one of sequentially and in parallel.

13. The computer-implemented method of claim 1, wherein analyzing comprises submitting the extracted textual content to at least one of the plurality of synthetic text detection engines via an API (Application Programming Interface).

14. The computer-implemented method of claim 1, wherein analyzing comprises submitting the extracted textual content to at least one of the plurality of synthetic text detection engines deployed one of locally and over a computer network.

15. The computer-implemented method of claim 1, wherein analyzing comprises detecting watermarks in the extracted textual content.

16. The computer-implemented method of claim 1, wherein analyzing is based on a binary classifier configured to classify the extracted textual content as being one of text written by a large language model and text written by a human.

17. The computer-implemented method of claim 1, wherein at least one of the plurality of synthetic text detection engines is configured for detection of synthetic text generated by a large language model.

18. The computer-implemented method of claim 17, wherein the large language model is one of GPT-X, OPT-XXX, BLOOM, PaLM and LLaMA-XX, where X is one of a number and a letter.

19. The computer-implemented method of claim 1, wherein the at least one of warning and protecting the recipient of the received email comprises adding an extended header to the email indicating that synthetic text was detected in the extracted textual content.

20. The computer-implemented method of claim 1, wherein the at least one of warning and protecting the recipient of the received email comprises adding a banner to the body of the received email.

21. The computer-implemented method of claim 20, wherein the banner includes at least one of:
at least one of a textual and graphic warning indicating that the textual content contains synthetic text;
an indication of one or several large language models that generated the synthetic textual content;
an indication of at least one synthetic text detection score;
an indication of at least one score threshold, and
an indication of whether the synthetic textual content was detected using a watermark-based method or a classifier-based method.

22. The computer-implemented method of claim 1, wherein the at least one of warning and protecting the recipient of the received email comprises at least one of:
highlighting any watermarks found in the detected synthetic textual content;
moving the received email to a specific folder;
deleting the received email, and
adding a label to the received email.

23. A computing device comprising:
at least one processor;
at least one data storage device coupled to the at least one processor;
a network interface coupled to the at least one processor and to a computer network;
a plurality of processes spawned by the at least one processor to generate metadata from images, the processes including processing logic for:
receiving an email addressed to a recipient;
extracting the sender of the received email;
determining whether the sender of the received email is a named individual;
when the sender is determined to be a named individual, extracting textual content from a body of the received email;
determining a size of the extracted textual content of the received email;
when a size of the extracted textual content is at least equal to a configurable size threshold, analyzing the extracted textual content using a plurality of synthetic text detection engines, each synthetic detection engine being configured to generate a synthetic text detection score;
comparing the synthetic text detection score outputted by each of the synthetic text decision engines to a respective score threshold associated with each of the plurality of synthetic text detection engines, and
at least one of warning and protecting the recipient of the received email when at least one synthetic text detection score output by one or more of the plurality of synthetic text detection engines is at least equal to its respective associated score threshold, which indicates a detection of synthetic textual content in the received email, by highlighting the detected synthetic textual content in the received email and by adding a prefix to the email subject indicating that synthetic text was detected in the extracted textual content.

* * * * *